US010839858B2

(12) United States Patent
Tordjman

(10) Patent No.: US 10,839,858 B2
(45) Date of Patent: Nov. 17, 2020

(54) METHOD FOR INLAYING IMAGES OR VIDEO WITHIN ANOTHER VIDEO SEQUENCE

(71) Applicants: Yves Darmon, Raanana (IL); Franck Tordjman, Netanya (IL)

(72) Inventor: Franck Tordjman, Netanya (IL)

(73) Assignees: Yves Darmon, Raanana (IL); Franck Tordjman, Netanya (IL)

(*) Notice: Subject to any disclaimer, the term of this patent is extended or adjusted under 35 U.S.C. 154(b) by 0 days.

(21) Appl. No.: 16/614,748

(22) PCT Filed: May 14, 2018

(86) PCT No.: PCT/FR2018/051167
§ 371 (c)(1),
(2) Date: Nov. 18, 2019

(87) PCT Pub. No.: WO2018/211207
PCT Pub. Date: Nov. 22, 2018

(65) Prior Publication Data
US 2020/0090703 A1 Mar. 19, 2020

(30) Foreign Application Priority Data
May 18, 2017 (FR) .................................. 17 54395

(51) Int. Cl.
H04N 5/77 (2006.01)
G11B 27/036 (2006.01)
(Continued)

(52) U.S. Cl.
CPC ....... G11B 27/036 (2013.01); H04N 5/23293 (2013.01); H04N 5/272 (2013.01);
(Continued)

(58) Field of Classification Search
CPC ... G11B 27/031; G11B 27/036; G11B 27/034; H04N 21/2743; H04N 21/41407;
(Continued)

(56) References Cited

U.S. PATENT DOCUMENTS 8,866,970 B1 10/2014 Lemoine
9,426,543 B1* 8/2016 Li ...................... H04N 21/8586
(Continued)

FOREIGN PATENT DOCUMENTS

EP 2289242 A1 5/2015
EP 2887686 A1 6/2015
WO 2009/156633 A2 12/2009

OTHER PUBLICATIONS

International Search Report for International Application No. PCT/FR2018/051167 dated Aug. 10, 2018, 2 pages.
(Continued)

Primary Examiner — Robert Chevalier
(74) Attorney, Agent, or Firm — TraskBritt

(57) ABSTRACT

A method for inlaying images within another video sequence comprises: —controlling the acquisition of the main sequence and recording it in a memory of mobile equipment; —simultaneously controlling, at the initiative of the user, a) the display of the main sequence in a first part of the display screen of the mobile equipment; b) acquiring the secondary video sequence with at least one image sensor of the mobile equipment; c) recording the secondary video sequence in the memory of the mobile equipment; d) displaying the secondary video sequence in a second part of the display screen of the mobile equipment, in a synchronous manner with the display of the main sequence; —transmitting the recordings over a server via a communication session; automatically controlling a step of inlaying the secondary video sequence ink the main sequence; —controlling the recording of the
(Continued)

merged sequence thus produced on the server; and computing an access link by an item of equipment remote from the merged sequence.

6 Claims, 2 Drawing Sheets

(51) Int. Cl.
*H04N 5/232* (2006.01)
*H04N 5/272* (2006.01)
*H04N 21/2743* (2011.01)
*H04N 21/414* (2011.01)
*H04N 21/4223* (2011.01)
*H04N 21/433* (2011.01)
*H04N 5/93* (2006.01)

(52) U.S. Cl.
CPC ......... *H04N 5/772* (2013.01); *H04N 21/2743* (2013.01); *H04N 21/41407* (2013.01); *H04N 21/4223* (2013.01); *H04N 21/4334* (2013.01)

(58) Field of Classification Search
CPC ........... H04N 21/4223; H04N 21/4334; H04N 21/47205; H04N 21/4788; H04N 21/8547; H04N 5/23222; H04N 5/23293; H04N 5/2621; H04N 5/265; H04N 5/272; H04N 5/772
USPC ........ 386/224, 278, 223, 235, 284, 326, 341
See application file for complete search history.

(56) References Cited

U.S. PATENT DOCUMENTS

| | | |
|---|---|---|
| 2010/0150526 A1* | 6/2010 | Rose .................... G11B 27/034 386/352 |
| 2014/0192198 A1 | 7/2014 | Tsau et al. |
| 2014/0232905 A1 | 8/2014 | Jung et al. |
| 2014/0300814 A1* | 10/2014 | Lemoine ................. G06T 11/60 348/501 |
| 2015/0138314 A1 | 5/2015 | Vincent |
| 2017/0134667 A1 | 5/2017 | Zhou et al. |

OTHER PUBLICATIONS

International Written Opinion for International Application No. PCT/FR2018/051167 dated Aug. 10, 2018, 5 pages.

* cited by examiner

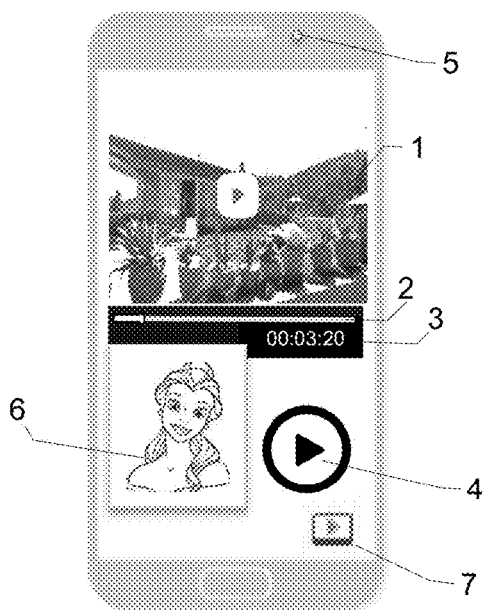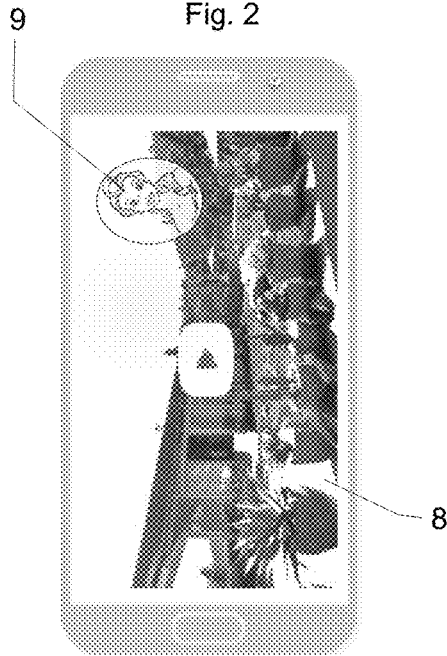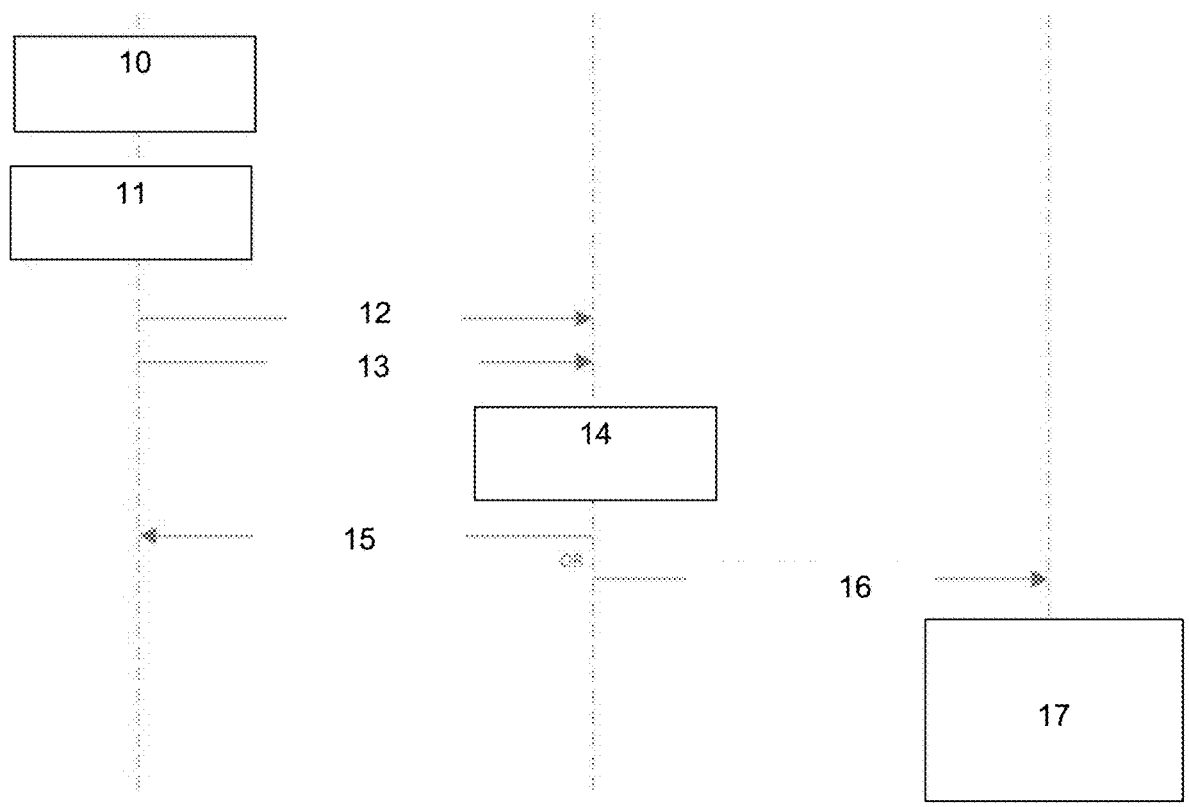

METHOD FOR INLAYING IMAGES OR VIDEO WITHIN ANOTHER VIDEO SEQUENCE

CROSS-REFERENCE TO RELATED APPLICATIONS

This application is a national phase entry under 35 U.S.C. § 371 of International Patent Application PCT/FR2018/051167, filed May 14, 2018, designating the United States of America and published as International Patent Publication WO 2018/211207 A1 on Nov. 22, 2018, which claims the benefit under Article 8 of the Patent Cooperation Treaty to French Patent Application Serial No. 17/54395, filed May 18, 2017.

TECHNICAL FIELD

The present disclosure relates to the general field of image processing, in particular, video sequences on mobile terminals. It more particularly relates to a method for inlaying images or video within another sequence of images or video.

BACKGROUND

As regards mobile video, the use of a cellular phone ("smartphone") or a tablet becomes widespread. One of the most widely used applications of connected mobile equipment is the creation of self-portraits of the "selfie" type or videos instantly broadcast on social networks or made available to third parties via a public or private server.

Some have also devised applications to be present on both sides of the lens at the same time, for example, to capture a landscape together with faces to share them with friends. Such an application is available on the digital store "app Store" under the trade name "Selfie Vista."

When the "Selfie Vista" application is launched, the front camera is active and displayed on the screen, but when a button associated with the dual recording function is pressed, the image is captured with the photo cell both front and back simultaneously.

Solutions for recording images from two sensors of the same connected mobile equipment are known from the state of the art.

The U.S. Pat. No. 8,866,970 describes, for example, a method for inlaying an image to be inlaid in a video sequence, for a mobile terminal such as a tablet or a smartphone, which includes the following steps:
  selection of an image to be inlaid,
  playback of the video sequence,
  display of the frame,
  determination of the presence of an inlay zone on the frame, the inlay zone being previously identified, or deduced according to a predefined algorithm,
  application of a deformation on the image to be inlaid, so as to make this image to be inlaid coincide with the shape of the inlay zone,
  display of the image combining the frame and the image to be inlaid, arranged in the inlay zone.

This solution offers a video sequence processing method on mobile terminals, more precisely, a real-time image inlay in the video stream. After computing the inlay points, the video stream is played back with the inlaid images. In order to perform the inlay, the image is merged to the video stream, frame by frame. For each frame, the image is positioned in the right place. This method involves the image undergoing a trapezoidal matrix transformation in real time so that it can adapt to the video stream.

The patent application EP2289242 describing a method for providing video content is also known, which includes the following steps:
  establishing a video session between a mobile terminal and a remote communication system;
  provision to the terminal, by the communication system, of a video enriched with one or more markers inlaid in the video; activation from the terminal of at least one marker during the video session
  sending by the communication system to the mobile terminal of a text message (e.g., SMS or e-mail) containing a bookmark associated with the activated marker.

Prior art solutions are not fully adapted to implementation on mobile equipment with limited resources for both storage and real-time calculation processing.

These solutions generally require real-time processing of video sequences at high resolution, which requires both very high RAM capacity to allow image merging calculations, as well as high permanent memory capacities and powerful graphics processors.

These solutions are therefore only suitable for sophisticated "high-end" terminals.

BRIEF SUMMARY

In order to remedy these disadvantages, the present disclosure in its broadest sense relates to a method for the production of video sequences using connected mobile equipment, the video sequence comprising a main sequence or an image and an inlay of a secondary sequence, characterized in that it comprises the following steps:
  controlling the acquisition of the main sequence and its recording in a memory of the mobile equipment, controlling, at the initiative of the user,
    a) the display of the main sequence in a first part of the display screen of the mobile equipment
    b) acquiring the secondary video sequence with at least one image sensor of the mobile equipment,
    c) recording the secondary video sequence in the memory of the mobile equipment
    d) displaying the secondary video sequence in a second part of the display screen of the mobile equipment, in a synchronous manner with the display of the main sequence,
  transmitting the recordings over a server via a communication session,
  automatically controlling a step of inlaying the secondary video sequence in the main sequence to create a merged sequence,
  controlling the recording of the merged sequence thus produced on the server, and computing an access link by an item of equipment remote from the merged sequence.

According to a first alternative solution, the method also includes a step of transmitting the merged sequence to the connected mobile equipment during the communication session.

According to a second alternative solution, the method also includes a step of transmitting the link of the merged sequence to a server hosting a third-party streaming application.

According to a third alternative solution, the method according to the present disclosure also includes a step of transmitting the link of the merged sequence to a server hosting a third-party video download application.

BRIEF DESCRIPTION OF THE DRAWINGS

The characteristics and advantages of embodiments of the present disclosure will be better appreciated through the following description, which sets out the characteristics of the present disclosure through an open-ended example of application.

The description is based on the appended figures representing:

FIG. 1 is a schematic view of the screen of a connected item of equipment during the acquisition phase of the second sequence.

FIG. 2 is a schematic view of the screen of a connected item of equipment during the playback phase of the sequence merged with the inlay.

FIG. 3 is an organization chart of the steps involved in the present method.

DETAILED DESCRIPTION

Figure 4:
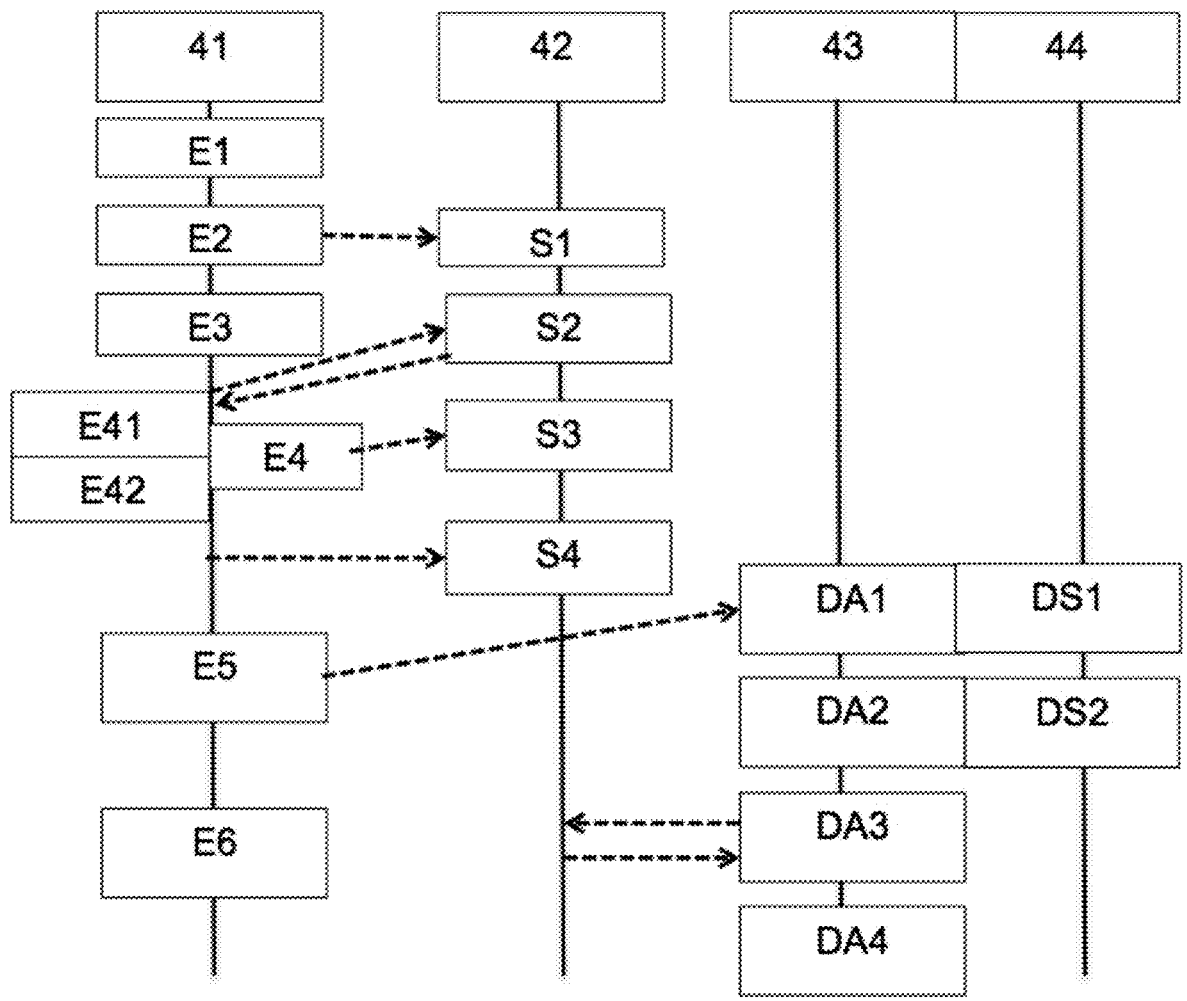
FIG. 4 is an organization chart of the steps for creating and revising a Selfyoo file.

The implementation of the present disclosure is based on connected mobile equipment, for example, a "smartphone" or a tablet, and a server to which the mobile equipment is connected.

To enable the mobile equipment to run the application to merge two series of images or videos, an application is first installed on the mobile equipment, for example by downloading a file containing the executable code from a download platform.

This code is compatible with the operating system of the mobile equipment, for example Android or iOS, and makes it possible for the software and hardware of the host mobile equipment to be controlled for enforcing the specific functionalities of the present disclosure.

To produce a sequence according to the present disclosure, an image or a video present in one's smartphone is first recorded or used, i.e., either a still image or a video sequence, which will constitute the main sequence. This sequence may be a view of a landscape during a tourist trip, or a sequence taken inside an apartment or a house that is desired to be rented or sold.

The next step consists in activating the application to control the display of a thumbnail 1 corresponding to an image of the main sequence in a part of the screen.

This thumbnail 1 is graphically associated with a time scroll bar 2 and an elapsed time counter 3.

A touch button 4 enables the user to control the start of the recording of a second video sequence from the front sensor 5 of the connected mobile equipment, which is displayed as a display zone 6 appearing in another part of the screen.

When the recording of the second sequence is satisfactory, the user activates the transmission to the server by means of a touch button 7 controlling the opening of a session and the transfer of the files corresponding to the first and second recordings.

The server then inlays the second video file into the image or the first video file, for example with a software application whose trade name is FF MPEG Merge.

The resulting file is recorded on the server and transmitted to the connected mobile equipment to allow a display, an example of which is shown in FIG. 2. On the screen, the content is presented as a single moving image formed by the main image 8 and a part 9 in which the recording of the second sequence appears.

Organizational Chart

The first step 10 consists in recording or using a still image or a video sequence with the back sensor of the connected mobile equipment and recording the file in a digital format, for example Mpeg, in the RAM of the mobile equipment.

The second step 11 consists in recording a second video sequence with at least one image sensor of the connected mobile equipment and recording the file in a digital format, for example Mpeg, in the RAM of the mobile equipment.

These two files are then transmitted to the server by transfer steps 12, 13.

The server then performs image processing 14 for inlaying the videos using an application such as FF MPEG Merge (trade name).

The resulting digital file is transmitted by a step 15 to the connected item of equipment and/or by a step 16 to a download or streaming server 17.

Selfyoo is an application that makes it possible to create advanced video selfies based on an overlay of videos.

In local situations (i.e., when the processing is performed on the equipment itself), it is impossible to create an overlay based on the original Android video player.

The company has developed an innovative and unique technological solution, thanks to a modification of the source code of the Android and/or iOS reader.

In addition to the basic video overlay, a non-cubic shape could successfully be added to the overlaid video selfie, thanks to a "transparent filter."

In the server/user situation (i.e., when the processing is performed on the server and sent back to the equipment), a Java 1.8.0 application has been developed with the use of the FFmpeg library (video editing tool) that gives the same possibilities as in a local situation (i.e., overlaid videos and a non-cubic frame).

The advantage of the server-based processing (Linux Ubuntu 14.0) is the addition of a motion capability of the overlaid video selfie.

From a technological point of view, the films have been divided into isolated images, the location of the elements for each image has been studied, and these have been reassembled into a single film.

An additional advantage is the storage of data in a MySQL 5.7.16 database.

FIG. 4 shows the system and the steps for creating and reviewing a Selfyoo file, which is an overlay of a video in a media database. The system includes, depending on the operation, a transmitter, a server and a recipient. The transmitter is a connected mobile item of equipment 41, for example, a "smartphone," which performs the steps E1-E6. The step E1 aims to select a media database. The media database can be a photo or a video, which is used as a wallpaper, over which another video can be overlaid. This selection can be made from photos or videos that are already saved in the phone photo/video gallery. It is also possible to take a picture or video directly with the Selfyoo application. When a video is selected, the video is compressed, either in real time during video shooting or after selection from the phone video gallery. After the user has completed step E1 and selected the media database, the transmitter starts step E2 to send it from the transmitter to the server, which is a work done in the background. On the transmitting equipment, the user then performs step E3 for recording an overlay video, which will be inlaid as an overlay in the media database.

Further to step E3, the Selfyoo application performs step E41 by requesting the creation of a Selfyoo identifier on the server. The request returns the Selfyoo identifier from the server to the transmitter. At the same time, the media database and the inlay video are locally saved on a phone folder and available on the "Selfyoo gallery."

The step E4 of sending the inlay video to the server is performed in parallel with the step E41 by the Selfyoo application on the phone in the background.

After the creation of the Selfyoo identifier in step E41, step E42 performs a deep link creation and a possibility to share this link. This link gives access to the Selfyoo file, in which the overlay video is inlaid in the media database.

Step E5 is about sharing the deep link through a third-party communication application or a social network, for example, Whatsapp, Facebook, email, etc. It is also possible to share the deep link through the Selfyoo application, which is itself a social sharing network. Step E6 gives the possibility to locally review the Selfyoo file on the transmitter.

Between the server 42 and the transmitter 41, the dotted lines represent the communications over the network. In the step S1, the server receives the media database from the transmitter. In step S2, the server returns the Selfyoo identifier created as a result of the request in step E41. In step S3, the server saves the overlay video sent in step E4. In step S4, the overlay video is inlaid in the media database to create a Selfyoo file, for which the wallpaper is the media database, as shown in FIG. 2.

A review is done on a recipient, which is a connected mobile item of equipment either with the Selfyoo application 43 or without the Selfyoo application 44. Between the recipients and the transmitter, the deep link is transmitted by a third party application such as Whatsapp, email, etc., as indicated by the dotted lines.

On the recipient with the Selfyoo application, in step DA1, the mobile item of equipment receives the link through its third-party application or via the Selfyoo application. In step DA2, the user clicks on the link, which opens the Selfyoo application. In step DA3, the Selfyoo application sends a playback request to the server, which triggers the download of the media database and the overlay video. In step DA4, the Selfyoo application on the recipient recreates the Selfyoo file by re-inlaying the overlay video in the media database in real time. This gives the possibility to move the overlay video, which is in a small inlay window in the media base that takes up the entire screen surface. If the media database is a photo, this function gives the possibility to position the video in different places in the photo to synchronize the comments in the video with specific places in the photo. If the media database is a video, this function makes it possible to synchronize the contents of two videos.

On the Selfyoo application of the recipient, it is also possible to reverse the roles of the media database and the overlay video, during the recreation of the Selfyoo file to the recipient. In this case, the prior overlay video takes up the entire screen surface, whereas the prior media database is positioned in a small Selfyoo inlay window.

On a recipient without the Selfyoo application, in step DS1, the user receives the deep link through a third-party application, for example, Whatsapp, email. In step DS2, the user clicks on the link and receives the Selfyoo file created in step S4, in which the inlay video is already inlaid in the media database. The Selfyoo file with an inlay video, which is an overlay video frozen on a wallpaper, is presented on a video player opened by default on the recipient, for example: browser, VLC, video player. This function does not make it possible to freely move the overlay video in the media database, nor to reverse the roles of the overlay video and the media database.

The invention claimed is:

1. A method for production of a video sequence using connected mobile equipment, the video sequence comprising a main sequence and an inlay of a secondary video sequence, comprising the following steps:
controlling acquisition of the main sequence and its recording in a memory of the mobile equipment,
controlling, at an initiative of a user,
  e) a display of the main sequence in a first part of the display screen of the mobile equipment,
  f) acquiring the secondary video sequence with at least one image sensor of the mobile equipment,
  g) recording the secondary video sequence in the memory of the mobile equipment, and
  h) displaying the secondary video sequence in a second part of the display screen of the mobile equipment, in a synchronous manner with the display of the main sequence,
transmitting the recordings over a server via a communication session,
automatically controlling a step of inlaying the secondary video sequence in the main sequence to create a merged sequence,
controlling the recording of the merged sequence thus produced on the server, and computing an access link by an item of equipment remote from the merged sequence.

2. The method of claim 1, wherein the acquisition of the main sequence is carried out by controlling at least one image sensor of the mobile equipment to capture a first image or a first video sequence of a determined duration.

3. The method of claim 1, wherein the acquisition of the main sequence is carried out by selecting a photo or a video from a photo or video gallery of the mobile equipment.

4. The method of claim 1, further comprising a step of transmitting the merged sequence to the connected mobile equipment during the communication session.

5. The method of claim 1, further comprising a step of transmitting the link of the merged sequence to a server hosting a third-party streaming application.

6. The method of claim 1, further comprising a step of transmitting the link of the merged sequence to a server hosting a third-party video download application.

* * * * *